United States Patent Office 3,342,568
Patented Sept. 19, 1967

3,342,568
COMPOSITE MATERIAL OF A CERAMIC SILVER GOLD ALLOY, AND A NICKEL ALLOY
Edward A. Capillon, Attleboro, Mass., assignor to Engelhard Industries, Inc., Newark, N.J., a corporation of Delaware
No Drawing. Filed Mar. 16, 1965, Ser. No. 440,291
3 Claims. (Cl. 29—195)

The present invention deals with a composite material and more particularly with a low-expansion composite material useful for obtaining an air-tight seal especially between metal and glass and which is also resistant to oxidation at elevated temperatures to permit subsequent cold-welding of the material to other metal components.

Various low-expansion base metal nickel-rich alloys are known for the production of glass to metal bonds. Some of such alloys, e.g., are known under the trade names Invar, Kovar and Niron. While effective in promoting glass to metal seals, such alloys at elevated temperatures are subject to oxidation which does not permit subsequent efficient cold-welding to other metal components. In order to overcome a detrimental degree of oxidation, it has been proposed to clad such nickel-rich alloys with a gold coating, e.g., 24 karat gold coatings. However, the nickel or iron content of such as the Niron alloy show extensive solubility in gold in the solid state in which the case the nickel or nickel and iron diffuse into the gold layer and eventually reach the outer surface whereupon oxidation occurs. For certain electrical applications, gold clad Niron wires, e.g., are embedded at one end into a glass powder composition and heated in air to about 1300° F. for approximately 30 minutes to effect a bond or seal between the clad wires and the glass. As an example, such clad wire may be in the form of flat tape 0.003" thick and 0.015" wide with the thickness of the gold cladding being about 0.0003". When such wire is subjected to the above heating cycle, iron and nickel from the Niron core diffuse into the gold cladding and eventually reach the outer surface of this cladding whereupon oxidation of these base metals occurs so that the cladding loses its bright yellow color and becomes covered with a brown to black oxide layer. These oxides are undesirable since they interfere with later cold-welding of other components to the portions of the clad wires protruding from the glass capsule. This condition, therefore, necessitates the application of a gold electroplate to the discolored clad wire prior to welding operations.

The composite material herein contemplated comprises a metal core composed of a nickel alloy, e.g., an alloy consisting by weight of 49.0% Ni, 0.1% C, balance Fe, or 42.5% Ni, 5.7% Cr, 0.1% C, balance Fe, or the Ni-Fe alloy known as Niron or the alloys known as Invar and Kovar. The core is clad with a coating of a gold-silver alloy containing from about 10% to about 75% gold, with a preferable alloy consisting of 58.3% gold and 41.7% silver.

The core material per se, while applicable as a low-expansion lead-in seal wire for glass capsules, lamps, etc., is subject to oxidation as mentioned above. Even when clad with a layer of gold, such gold clad material is also subject to oxidation as described above because of the diffusion of the nickel and iron into the gold cladding.

While the base metals are soluble in gold in the solid state, such base metals are almost completely insoluble in silver in the solid state. Therefore, in accordance with the invention the larger the proportion of silver in the gold-silver alloy the lower is the rate of diffusion or migration of nickel or iron into such a gold-silver alloy when the clad material is subject to high temperatures such as about 1200° F. for extended periods of time.

EXAMPLE

A gold alloy tube consisting of 58.3% gold and 41.7% silver was prepared. A round bar of Niron alloy was prepared. The bar was inserted into the gold alloy tube and the components were bonded together under heat and pressure. The resulting composite bar was subsequently swaged, drawn and rolled into a flat tape about 0.003" thick and 0.015" wide. This composite tape was embedded at one end into a glass powder composition and heated in air to 1200° F. at different cycle periods up to a 30 minute cycle, and also such tape was identically treated at 1300° F. for various cycle periods up to 30 minutes. Glass beads were formed on the ends of the tape by the fusion of the glass powder. In all cases, there was no change whatsoever in the color of the gold cladding regardless of the temperature or length of time of exposure. For practical purposes, in order to assure sufficient resistant to oxidation, the silver content of the alloy is at least 25% up to about 90% by weight.

Various gold alloy claddings are herein contemplated within the above-mentioned range.

What is claimed is:

1. A material comprising glass bonded to a composite material comprising a core composed of a nickel-rich alloy clad with a silver-gold alloy containing essentially from 25–90% silver.

2. A material comprising glass bonded to a composite material comprising a core composed of low-expansion nickel-rich base metal alloy clad with a gold-silver alloy containing essentially from 10–75% gold.

3. A material comprising glass bonded to a composite material comprising a core composed of low-expansion nickel-rich base metal alloy clad with an alloy consisting of 58.3% gold and 41.7% silver.

References Cited

UNITED STATES PATENTS

| | | | |
|---|---|---|---|
| 2,354,409 | 7/1944 | Strasser | 29—199 |
| 2,391,457 | 12/1945 | Carlson | 29—199 X |
| 2,691,816 | 10/1954 | Siegel | 29—199 X |
| 2,857,663 | 10/1958 | Beggs | 29—195 X |

OTHER REFERENCES

Metals Handbook, 1948, edition, page 1,116.

HYLAND BIZOT, *Primary Examiner.*